United States Patent Office 3,744,980
Patented July 10, 1973

3,744,980
METHOD FOR MAKING ARTIFICIAL FUEL FROM PAPER AND PRODUCT
Fritz B. Harris, 15840 Lancaster Road,
Los Gatos, Calif. 94030
Filed Oct. 28, 1970, Ser. No. 84,828
Int. Cl. C10l 9/00, 5/36
U.S. Cl. 44—1 R                     9 Claims

ABSTRACT OF THE DISCLOSURE

The method of this invention provides the following steps: Dry, ground paper of all sorts is placed in a basket type porous container, which container is the shape of the ultimate product. While in the container the loose ground paper particles put under compression which is very slight, not more than 6 or 7 p.s.i. to condense them slightly. The container with the dry paper particles is then dipped in hot liquid wax or otherwise coated by hot liquid wax and remains under this treatment to secure the depth of penetration or absorption required to provide the desired length of burning time. The greater the depth of penetration the longer the burning time. The filled porous container is then removed from the treatment of the hot liquid wax and either air dried or refrigerated to form a relatively hard wax shell which for the first time gives the product integrity of form. When integrity of form is assured, the wax surfaced product is then removed from the porous container and is ready for sale and distribution. Amongst the unexpected results is, that when the wax outer coating is ignited the melting wax is hot enough to penetrate in all directions toward the center where loose ground paper is progressive treated with hot wax and thus further extends the burning cycle and makes it uniform.

BACKGROUND OF THE INVENTION

Although, the process of mixing wood pulp and binding materials to form artificial fuels has been known for a number of years, nevertheless the ecology of making waste materials available and useful, has become more and more imperative with the progressing of the years. Also, there have been many products made from a slurry of water and paper pulp which slurry dries hard and firm. The making of fuel from waste paper, particularly newsprint, has not been successful because of the difficulty in forming a product of integrity and good burning characteristics at reasonable price.

SUMMARY OF THE INVENTION

The present invention was developed to meet the challenges of ecology and to produce a consumable such as a fuel out of relatively cheap and plentiful waste product without the necessity of complicated chemical formulations which would make the product prohibitive so far as cost and every day use are concerned.

Most of the effort in this direction has been in the past due to use a slurry of water and paper pulp which has to be dried, and when this is dried it forms a hard substance which is not readily ignited, and does not always burn to an ash. Furthermore, the concept that is necessary to add water and then take it out so that it will be flammable does not commend itself to logical thinking or commercial practicality. The present invention does not add water so there is none to be taken out. The raw material is ground or finely comminuted waste paper which has no integrity in and of itself to form any product. The shape is determined by the porous basket in which it is placed. Then integrity of form is given to the product by the wax coating which in and of itself is readily ignitable. The product is one which is easily packaged, handled, relatively light weight, and inexpensive.

Further objects are to provide a construction of maximum simplicity and economy. Also such further objects, advantages and capabilities as will fully appear and as are inherently possessed by the device and invention described herein.

The invention further resides in the combination, construction and arrangement of parts illustrated in the accompanying drawing, and while there is shown therein a preferred embodiment thereof, it is to be understood that the same is illustrative of the invention and that the invention is capable of modification and change and comprehends other details of construction without departing from the spirit thereof or the scope of the appended claims.

BRIEF DESCRIPTION OF THE DRAWING

Referring to the drawing.

DESCRIPTION OF THE PREFERRED EMBODIMENTS

Figure 1:
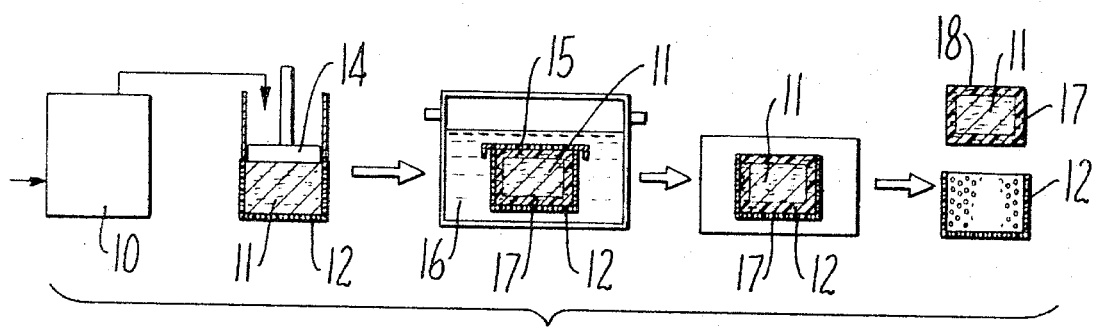
FIG. 1 is a progressive schematic rendering of the steps in the forming of the artificial fuel unit.

Referring now more particularly to the drawing in which like numerals represent like parts in several views, and particularly reference to FIG. 1 there is shown schematically the successive steps or states in the production of the artificial fuel unit disclosed herein. The schematic rendering is in a vertical transverse section. In FIG. 1 the rectangle at the left represents a paper milling or paper grinding machine in which all kinds of waste paper is ground and finally comminuted until the particles thereof will barely pass through a ⅛ inch screen. As indicated, practically any type of waste paper may be used such as newsprint, magazine, carbon paper, or practically any combination of the various types may be used, as long as it is in a clean dry state at the beginning.

The dry ground paper 11 which is fluffy in form, is then delivered to a porous container 12 which is the exact size and shape of the finished fuel product. Obviously any desired size or shape may be used. The container is entirely perforated or made of open web screening having openings less than ⅛ inch, so that the dry ground paper will not pass therethrough. The top of the container 12 being open and uncovered permits the press 14 to tamp down the dry ground paper 11 under a pressure of approximately 7 p.s.i., but not more than that, which is very light pressure and not intended to pack or solidify the dry ground paper 11. The press 14 forces the dry ground paper to assume a level approximating the top of the container 12. After this very moderate and limited pressure the container 12 is covered with porous cover 15 of the same material and porosity. The dry ground paper 11 is still in a fluffy condition and has no integrity or unity in and of itself. As will be observed, the cover 15 keeps finely comminuted paper within the container.

The covered container is then placed in or submitted to hot liquid petroleum wax 16 for a period of time required to obtain the required or desired penetration and absorption of the wax by the ground paper, from the surface inwardly. In FIG. 1 the penetration of the wax is shown by the shaded area 17. The wax is preferably of the specification of Chevron Slack Wax No. 140, heated to a temperature 170° F., or greater. Chevron Slack Wax No. 140 is a petroleum wax mixture of oil and wax, solid at normal temperatures and has a congealing point AMP 140° F. The hot liquid wax enters the container 12 through its multiple apertures on each of its faces and is immediately absorbed by the dry paper. Penetration of the wax is uniform on all sides due to the uniform porosity of the container 12 and its cover 15. It is apparent that penetration may be secured at atmospheric pressure or with higher pressure if desired. Obviously the wax is a relatively higher cost component compared with the rest of the materials used, and therefore this factor may somewhat limit the economic thickness of the penetration. Normally the penetration is not less than ¼ inch and not more than ½ inch. Higher pressures than atmospheric may be used to obtain the desired penetration to reduce the amount of time required to make penetration.

After the treatment with hot wax the container 12 is removed and delivered to a cooling room where the cover-15 is removed to secure more surface exposed to the cooling process. This room may be refrigerated, or cooling may be done artificially with water in any well-known manner. The product is cooled until the wax solidifies in the form a unified shape corresponding with that of the porous basket. When the product has sufficiently cooled to assure an integral form, it is removed from the container or basket 12. For the first time the product 18 has an integrity of its own and may be handled for purposes of packing, shipping, and retail distribution. The product 18 is clean and non-greasy. The wax does not change form unless subected to unusually high temperatures not encountered in normal commerce or storage. Accordingly the dry ground paper with the outer shell of combined wax and paper is wrapped or otherwise suitably packaged for commercial distribution.

If the wrapping is paper the wrapper may be ignited to start the burning cycle of the finished product. The package then becomes substantially completely consumable.

As will be observed from the drawings, the center portion of the product 18 still remains ground fluffy paper of the original state.

Figure 2:
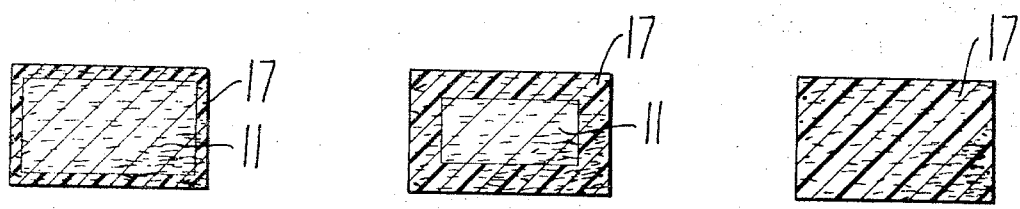
FIG. 2 is a schematic illustration showing the variations in the penetration and absorption of the hot wax in the final fuel product.

In FIG. 2 there is illustrated some of the various degrees to which wax penetration 17 may be carried. In the first form of FIG. 2 the wax penetration is just deep enough to form a good shell to contain the inner ground dry paper. The various depths of wax penetration into the ground dry paper is determined by a number of factors, such as the density of the tamped ground paper in the porous container. Wax penetration and absorption increases as the temperature of the melted wax increases, or wax penetration may be increased by lengthening time of contact between the dry ground paper and the hot wax. This of course is in addition to various other facets such as the pressure used to force the hot liqud wax into the paper. Up to a point, the greater the amount of wax penetration the longer the cycle of burning with respect to a given size of artificial fuel unit. As was said above, ½ inch penetration seems to be the economic maximum, although in FIG. 2 the second form shows an extreme of practically ½ penetration and the third form shows full penetration. Penetration and absorption of ¼ inch will produce a burning substantially equal to the same amount of dry oak.

In general, it has been observed, the greater amount of wax absorption and penetration the longer burning cycle of a given size.

Figure 3:
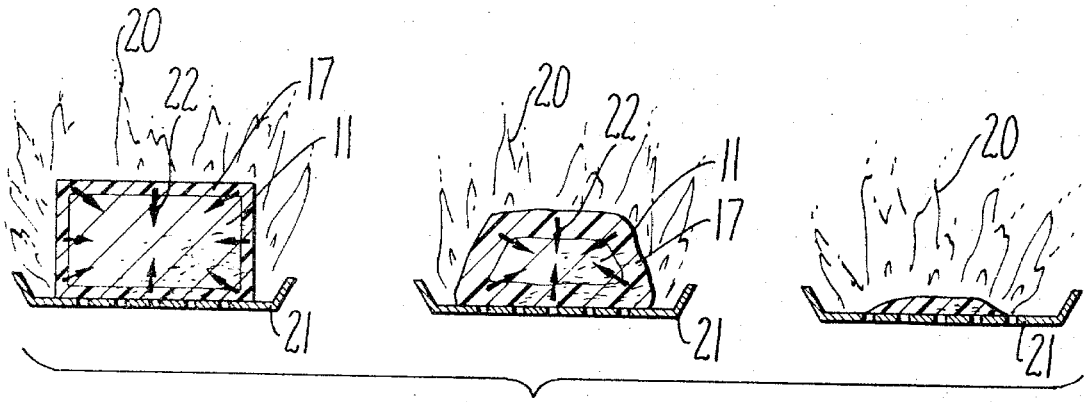
FIG. 3 is a schematic showing of successive states of the artificial fuel during the burning cycle.

FIG. 3 shows successive stages of the burning cycle of the artificial fuel. These show the usual unexpected results which are characteristic of this product. When the solid wax coating 17 is ignited, being a combustible material, its flames are shown at 20. For purposes of neatness, the burning of this fuel is placed in a shallow container 21 which is perforated throughout the bottom area to provide a draft for the burning, so that any melted wax before it is completely consumed does not run out of or through the pan itself. Chevron Slack Wax No. 140, is of the no drip type and therefore is consumed in the burning without unsightly drip which would be a nuisance. The first portion of FIG. 3 shows the artificial fuel at the time of the first igniting. As the wax 17 burns with its paper binder, it also melts. The melting on the inside produces liquid wax available for penetration of and absorption by the dry paper particles 11 on the interior. The arrows 22 indicate the penetration of the melted wax toward the center of the fuel unit. Thus, the exterior of the product exposed to the flame and the burning, continuously provides the previously dry and fluffy paper in the interior with absorbed wax to make a uniform source of material constantly available for the burning process. The second portion of FIG. 3 shows the partial burning of the unit with the burning surface constantly being supplied with a uniform mixture of wax and paper, thus accomplishing uniform burning from start to finish. The finish, or very near to the finish is shown substantially in the third portion of FIG. 3 where only the wax impregnated paper remains and this gives the same high heat as before. In this manner, the originally dry ground paper with newly absorbed liquid wax continues the regular uniform burn until only an approximately 0.60% ash remains. The burning progress as described operates as a "wick action" where they dry ground paper on the interior is constantly being penetrated and absorbed greatly increasing the burning time of the unit and providing a regular uniform flame throughout the burning cycle with virtually no visible smoke. All of the combustible materials are consumed in the burning leaving only a minimum of ash.

I claim:

1. In the method of producing artificial fuel units the steps of grinding dry paper to a size to barely pass through a ⅛ inch mesh screen, delivering the dry ground paper to a porous container having the size and shape of the final product, lightly tamping the dry ground paper in the container to the level of the top thereof, closing the container with a cover having the same porosity as the container, submitting the closed container and its contents to a hot melted petroleum wax so that the wax and the ground paper combine from the outside inwardly, cooling the container and its contents to solidify the shell of combined wax and paper to provide a fuel unit of physical integrity, and removing the fuel unit from the container.

2. The method of claim 1 where the tamping does not exceed 7 p.s.i.

3. The method of claim 1 where the wax is a petroleum wax which is a mixture of oil and wax, solid at normal temperatures with a congealing point at 140° F. heated to a temperature of not less than 170° F.

4. The method of claim 1 wherein the wax depth of penetration is controlled by time and pressure.

5. The method of claim 1 wherein the submission to the hot melted petroleum wax is sufficient to provide a minimum penetration and absorption of ¼ inch.

6. An artificial fuel product easily ignited with a household match and which will burn with a flame substantially equivalent to an equal amount of dry oak, comprising in combination a unit having a hardened shell of petroleum wax combined with finely ground paper with an interior filled with dry fluffy finely ground paper.

7. The product of claim 6 wherein the dry finely ground paper acts as a wick to combine with melted petroleum wax as the burning progresses.

8. The product of claim 6 wherein the petroleum wax is a mixture of oil and wax, solid at normal temperatures with a congealing point at 140° F.

9. The product of claim 6 wherein the same is wrapped in paper for easy igniting.

References Cited

UNITED STATES PATENTS

| | | | |
|---|---|---|---|
| 1,401,803 | 12/1921 | Lynes | 44—40 |
| 1,625,133 | 4/1927 | Mohler | 44—14 |
| 2,475,768 | 7/1949 | Williams et al. | 44—10 R |
| 235,756 | 12/1880 | Elliott | 44—6 |
| 2,094,661 | 10/1937 | Macleay et al. | 44—41 |

CARL F. DEES, Primary Examiner

U.S. Cl. X.R.

44—6, 14, 24, 41